(12) United States Patent
Shimada

(10) Patent No.: US 6,278,780 B1
(45) Date of Patent: Aug. 21, 2001

(54) METHOD OF AND AN APPARATUS FOR GENERATING INTERNAL CRYPTO-KEYS

(75) Inventor: Michio Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/182,014

(22) Filed: Oct. 29, 1998

(30) Foreign Application Priority Data

Oct. 31, 1997 (JP) .................................................. 9-314567

(51) Int. Cl.[7] ...................................................... H04L 9/00
(52) U.S. Cl. .............................. 380/47; 380/44; 380/278; 380/264; 380/223
(58) Field of Search ..................................... 380/223, 264, 380/278, 44, 47

(56) References Cited

U.S. PATENT DOCUMENTS 5,003,596 * 3/1991 Wood ...................................... 380/28
5,608,801 * 3/1997 Aiello et al. ............................ 380/48
6,182,216 * 9/1998 Luyster ................................. 713/168

OTHER PUBLICATIONS

Bruce Schneier, "Applied Cryptography, Second Edition, Protocols, Algorithms, and Source Code in C", Published by John Wiley & Sons, Inc., 1996, pp. 369–395.

T. Siegenthaler, "Correlation–Immunity of Nonlinear Combining Functions for Cryptographic Applications", IEEE Transactions on Information Theory, vol. IT–30, No. 5, Sep. 1984, pp. 776–780.

* cited by examiner

Primary Examiner—Thomas R. Peeso
Assistant Examiner—Todd Jack
(74) Attorney, Agent, or Firm—Young & Thompson

(57) ABSTRACT

To provide a method of generating internal crypto-keys to be set initially in a feedback-shift-registers of a pseudo-random-sequence generator of a stream cipher system with sufficient security and sufficiently high speed as well, the method comprises: a step of outputting m sets of first conversion results, obtaining i-th set of the first conversion results by processing (i–1)-th set of the first conversion results with a first one-way-function; a step of outputting m sets of second conversion results, obtaining i-th set of the second conversion results by processing (i–1)-th sets of the second conversion results with a second one-way function; and a step of outputting j-th internal crypto-key by XORing j-th set of the first conversion results and (m–j+1)-th set of the second conversion results.

8 Claims, 5 Drawing Sheets

METHOD OF AND AN APPARATUS FOR GENERATING INTERNAL CRYPTO-KEYS

BACKGROUND OF THE INVENTION

The present invention relates to a method of and an apparatus for generating internal crypto-keys which are used as initial values to be set in feedback registers of an pseudo-random-sequence generator for generating pseudo-random-numbers to be XORed (added according to eXclusive OR logic) onto a data sequence recorded in a recording medium or to be transmitted in a communication system, for preventing a third party from tapping the data sequence without permission.

Cryptography called secret-key-cryptography can be classified into two types, cryptography called block ciphers and cryptography called stream ciphers. In the former cryptography, data of a fixed length, 64 bits, for example, called the plain text is transformed into a data block called the cipher text according to a certain transformation algorithm. On the other hand, a sequence of pseudo-random-numbers called the key-stream is XORed onto a data stream called the plain text stream to be converted into a cipher-stream.

As a method of generating a pseudo-random-sequence which is cryptographically secure, there is known a method making use of a one-way function such as a public-key-cryptograph function. Here, the one-way function means a function f(x) which can be easily calculated from a variable x, but it is hardly possible to estimate the variable x from an output of the function f(x).

FIG. 5 is a block diagram illustrating a configuration example of a conventional pseudo-random-sequence generator which generates the cryptographically secure pseudo-random-sequence.

Referring to FIG. 5, an external key-data of n-bits is supplied to a first input terminal 405. A one-way function circuit 101 outputs an n-bit conversion result by processing n-bit output of a selector 201 with a certain one-way function (such as a public key function) according to a certain conversion parameter (such as a public key) supplied to a second input terminal 104. The LSB (Least Significant Bit) of the conversion result is output from an output terminal 508 as a bit of the pseudo-random-sequence.

With each clock pulse CLK supplied from a clock terminal 210, a register 202 outputs registered n-bit data to the selector 201 and newly registers the n-bit conversion result of the one-way function circuit 101.

Only when the clock pulse CLK is supplied for the first to the register 202, a selection signal SEL supplied to the selector 210 through a selection terminal 211 is set at logic '0' for controling the selector 201 to output the external key-data supplied from the first input terminal 405 to the one-way function circuit 101, and afterwards the selection signal SEL is turned to logic '1' so that the selector is controlled to select the output of the register 202 to be fed-back to the one-way function circuit 101.

Thus, the pseudo-random-sequence is output bit-by-bit from the output terminal 508 in synchronization with the clock pulse CLK.

The pseudo-random-sequence generator of FIG. 5 is known to be cryptographically secure. However, calculation of the one-way function takes comparatively long time.

Therefore, a pseudo-random-sequence generator consisting of combination of several linear feedback-sift-registers or nonlinear feedback-shift-registers is generally used for generating the key-stream of the stream cipher, when a high speed is required, having such configuration as illustrated in a block diagram of FIG. 6.

In the pseudo-random-sequence generator of FIG. 6, there are comprised linear feedback-sift-registers or nonlinear feedback-shift-registers (hereinafter generically called the feedback-shift-registers) $S_1$ to $S_n$. To each of the feedback-shift-registers, working as a sub-generator, an internal key $K_1$ to $K_n$ is set initially. At each clock, each of the feedback-shift-resisters is shifted by one bit outputting its LSB to a combination function F, and its MSB (Most Significant Bit) is generated according to a certain feedback function from its registered bit sequence. The combination function F generates a key-stream bit by bit according to a certain combination function from outputs of the feedback-shift-registers $S_1$ to $S_n$.

However, the key-stream generated making use of feedback-shift-registers, such as illustrated in FIG. 6, may sometimes be broken by a deciphering method called correlation attacks. So, various kinds of devices has been studied, whereof some examples are described in "Applied Cryptography, Second Edition: Protocols, Algorithms, and Source Code in C," by Bruce Schneier, published by John Wiley & Sons, Inc., 1996, and as to the correlation attacks, there is an explanation in "Correlation-Immunity of Nonlinear Combining Functions for Cryptographic Applications" by T. Siegenthaler, IEEE Transactions on Information Theory, Vol. IT-30, No. 5, 1984, for example. However, description of details of the pseudo-random-sequence generator itself or the correlation attacks is omitted, here.

In any way, to be sufficiently robust against cryptographic analysis such as the correlation attacks, sufficient numbers of sufficiently long-bit feedback-shift-registers should be used for generating the key-stream, which requires numbers of internal keys to be set to the feedback-shift-registors as their initial values.

On the other hand, bit-length of a secret crypto-key is usually limited practically, such as 64 bits, for example. Therefore, it is important for the pseudo-random-sequence generator consisting of feedback-shift-registers how to securely generate numbers of internal keys to be set thereto, from a secret-key given from external (hereinafter called the external key).

As above mentioned, one or some internal keys may be estimated by the correlation attacks. Hence, when the internal keys are generated from a single external key without sufficient care, all the internal keys may be easily estimated based on the broken internal keys.

Cryptographically secure internal keys may be obtained making use of a one-way function in the same way with generating the pseudo-random-sequence itself, by the pseudo-random-sequence generator of FIG. 5, for example. However, a demerit of obtaining the internal keys by way of the one-way function lies in that it takes too long time even for generating the internal keys once at the beginning of a cipher-stream. Because, the pseudo-random-sequence generator cannot but generate the pseudo-random-numbers bit by bit. Therefore, n×m clocks should be needed for generating n sets of internal keys of m bits, for example, and the clock frequency cannot be made high because of comparatively long calculation time of the one-way function.

SUMMARY OF THE INVENTION

Therefore, a primary object of the present invention is to provide method of and an apparatus for generating internal crypto-keys to be set initially in the feedback-shift-registers of a pseudo-random-sequence generator of the stream cipher system, with sufficient security and sufficiently high speed as well.

In order to achieve the object, a method according to the invention of generating internal crypto-keys from an external key comprises:

a step of outputting m sets of first conversion results, each i-th of the m sets of first conversion results being obtained by processing an (i−1)-th of the m sets of first conversion results with a first non-linear function and first of the m sets of first conversion results being obtained by processing a first part of the external key with the first nonlinear function, m being a positive integer more than one, i being a positive integer more than one and not more than m, and the first nonlinear function being a function wherein a variable giving a value of the function is difficult to be estimated from the value of the function;

a step of outputting m sets of second conversion results, each i-th of the m sets of second conversion results being obtained by processing an (i−1)-th of the m sets of first conversion results with a second nonlinear function and first of the m sets of second conversion results being obtained by processing a second part of the external key with the second nonlinear function, the second nonlinear function being a function wherein a variable giving a value of the function is difficult to be estimated from the value of the function; and a step of outputting each j-th of m internal crypto-keys by combining a j-th of the m sets of first conversion results and an (m−j+1)-th of the m sets of second conversion results according to a combining function, j being a positive integer not more than m, so that each bit of the j-th of the m internal crypto-keys has XOR logic of corresponding bits of the i-th of the m sets of first conversion results and the (m−j+1)-th of the m sets of second conversion results, for example.

Each of the first nonlinear function and the second nonlinear function is preferably a one-way function wherein a variable giving a value of the one-way function is substantially impossible to be estimated from the value of the one-way function.

Therefore, by giving an external key of 2n bits, the apparatus of the invention can generates m sets of internal keys of n bits at once, that is, about n times faster than to generate the same number of internal keys by way of the pseudo-random-sequence generator of FIG. 5, wherein only an LSB is available at one clock.

Further, even if a third party, who does not know the external key, might have succeeded to obtain a k-th (k being 1 to m) internal key by some means, and to estimate a k-th of the m sets of first conversion results and an (m−k+1)-th of the m sets of second conversion results, other internal keys can be protected from the third party with sufficient security.

The above method can be realized with an apparatus, for example, comprising:

a one-way-function circuit for outputting a conversion result by processing an input bit sequence with a one-way function;

a register for holding the conversion result outputted from the one-way-function circuit and outputting the conversion result previously held in the register in synchronization with a clock signal;

a selector for selecting either the external key or an output of the register according to a selection signal as the input bit sequence to be processed by the one-way-function circuit;

a LIFO (Last-In-First-Out) buffer wherein conversion results output from the one-way-function circuit are stacked in synchronization with the clock signal when the LIFO buffer is controlled in a writing mode, and the conversion results stacked in the LIFO buffer are popped up in synchronization with the clock signal when the LIFO buffer is controlled in a reading mode; and a combining circuit for outputting internal crypto-keys in synchronization with the clock signal by combining outputs of the LIFO buffer and the one-way-function circuit.

In the above apparatus, the LIFO buffer is controlled in the writing mode for first m clock pulses after initialization. At the first one clock, the external key is selected by the selector as the input bit sequence to be processed by the one-way-function circuit, and afterwards, the output of the register is selected, so that m sets of conversion results are stacked in the LIFO buffer. Then, the LIFO buffer is controlled in the reading mode for following m clock pulses, in order to generate m internal crypto-keys by combining outputs of the one-way-function circuit and the LIFO buffer, clock by clock.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
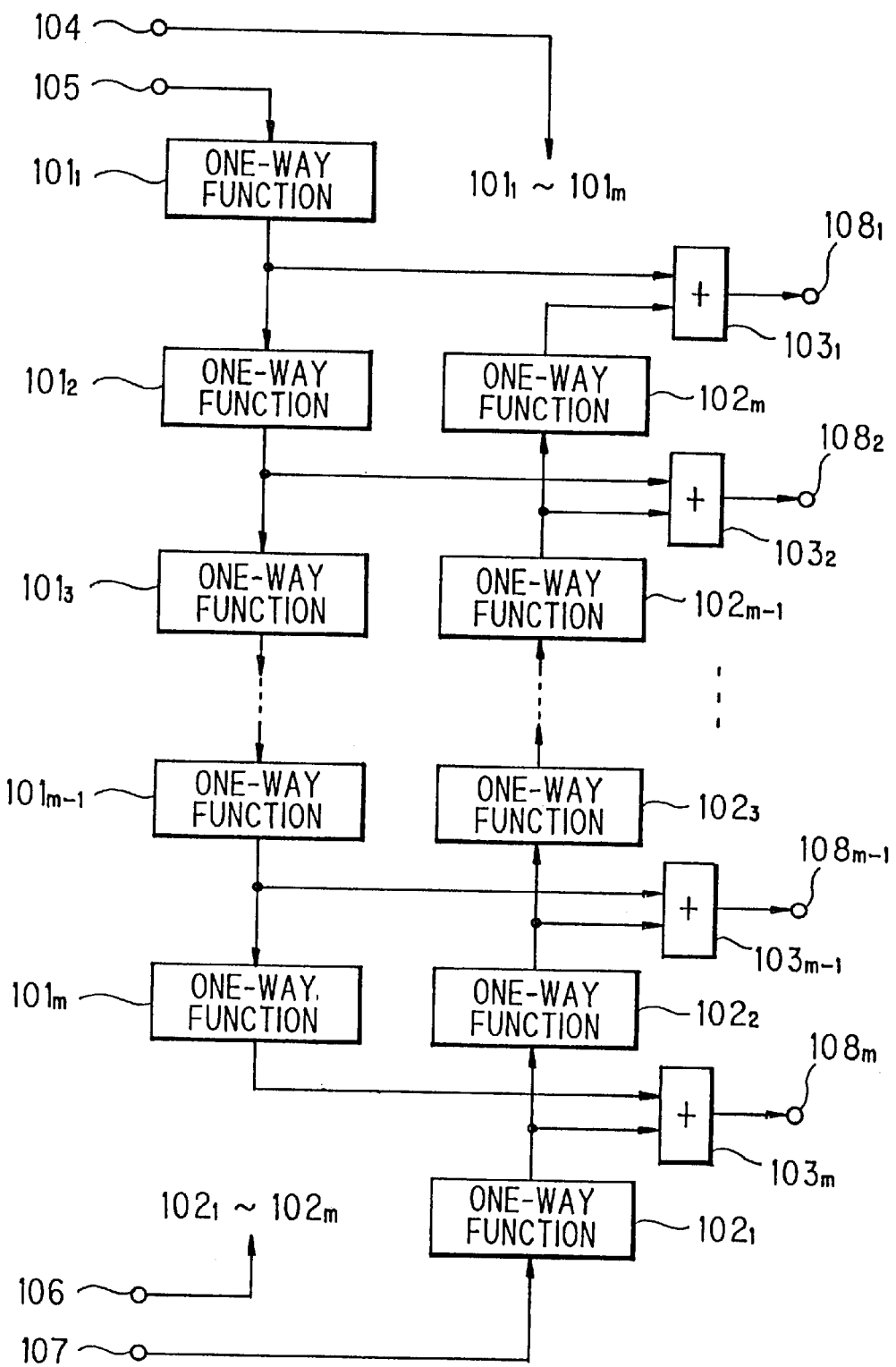
FIG. 1 is a functional block diagram illustrating an apparatus for generating internal crypto-keys according to a first embodiment of the invention.

FIG. 1 is a functional block diagram illustrating an apparatus for generating internal crypto-keys according to a first embodiment of the invention.

Referring to FIG. 1, the apparatus comprises a first cascade connection of a first to an m-th one-way-function circuit $101_1$ to $101_m$, a second cascade connection of another first to another m-th one-way-function circuit $102_1$ to $102_m$ and a first to an m-th n-bit XOR circuit $103_1$ to $103_m$.

Half n bits (upper half n bits, for example) of an external key-data of 2n bits are supplied to the first one-way-function circuit $101_1$ of the first cascade connection through a first external-key input terminal 105, and the other n bits of the external key-data are supplied to the first one-way-function circuit $102_1$ of the second cascade connection through a second external-key input terminal 107.

In the first cascade connection, the first one-way-function circuit $101_1$ outputs a conversion result of n bits by processing the first half n-bit data of the external key with a first one-way function according to a first conversion parameter (public key) supplied through a first public-key input terminal 104, and each i-th ($101_i$; i being 2 to m) of the second to the m-th one-way-function circuit outputs a conversion result of n bits by processing an output of the (i−1)-th one-way-function circuit $101_{i-1}$ with the first one-way function according to the first conversion parameter.

In the same way, the first one-way-function circuit $102_1$ of the second cascade connection outputs a conversion result of n bits by processing the other half n-bit data of the external key with a second one-way function according to a second conversion parameter (public key) supplied through a second public-key input terminal 106, and each i-th ($102_i$; i being 2 to m) of the second to the m-th one-way-function circuit outputs a conversion result of n bits by processing an output of the (i−1)-th one-way-function circuit $102_{i-1}$ with the second one-way function according to the second conversion parameter, in the second cascade connection.

Each i-th (i being 1 to m) of the first to m-th XOR circuit $103_1$ to $103_m$ calculates an XOR bit sequence of n bits to be output as an i-th internal key through corresponding one ($108_i$) of a first to an m-th output terminal $108_1$ to $108_m$, from outputs of the i-th one-way-function circuit $101_i$ of the first cascade connection and the (m−i+1)-th one-way-function circuit $102_{m-i+1}$ of the second cascade connection, so that each bit of the XOR bit sequence has XOR logic of corresponding two bits of outputs of the i-th one-way-function circuit $101_i$ and the (m−i+1)-th one-way-function circuit $102_{m-i+1}$.

The apparatus for generating internal crypto-keys of FIG. 1 according to the first embodiment is thus configured. Therefore, by giving an external key of 2n bits together with a first and a second conversion parameter (public key), the apparatus of FIG. 1 can generates m sets of internal keys of n bits at once, that is, about n times faster than to generate the same number of internal keys by way of the pseudo-random-sequence generator of FIG. 5, wherein only an LSB is available at one clock.

Further, even if a third party, who does not know the external key, might have succeeded to obtain a k-th (k being 1 to m) internal key output from the k-th output terminal $108_k$ by some means, and to estimate outputs of the k-th one-way-function circuit $101_k$ of the first cascade connection and the (m−k+1)-th one-way-function circuit $102_{m-k+1}$, other internal keys can be protected from the third party.

This is because the third party cannot trace but outputs of the k-th to the m-th one-way-function circuit $101_k$ to $101_m$ of the first cascade connection and (m−k+1)-th to m-th one-way-function circuit of the second cascade connection according to characteristic of the one-way function, even if he might have obtained the outputs of the k-th one-way-function circuit $101_k$ and the (m−k+1)-th one-way-function circuit $102_{m-k+1}$. Therefore, the third party cannot obtain but either of two inputs of the first to the m-th XOR circuit $103_1$ to $103_m$ except the k-th XOR circuit $103_k$, which makes hardly possible to estimate other internal keys for the third party which knows neither the external key nor the internal keys.

Practically saying, it is very difficult for the third party to estimate the outputs of the k-th one-way-function circuit $101_k$ and the (m−k+1)-th one-way-function circuit $102_{m-k+1}$, even if he has succeeded to obtain the k-th internal key. Therefore, even if more than one internal keys be broken, it is impossible to estimate other internal keys.

In the embodiment of FIG. 1, the same one-way-function circuits given with the same conversion parameter are described to be used in either of the first cascade connection or the second cascade connection. However, they may be different with each other and may be given different conversion parameters with each other in either or both of the first and the second cascade connection, or on the contrary, one-way-function circuits which process their input bit sequences with the same one-way-function may be applied to all the one-way-function circuits of the first and the second cascade connection, given with the same or different conversion parameters.

The one-way-function circuits may be used cyclically.

Figure 2:
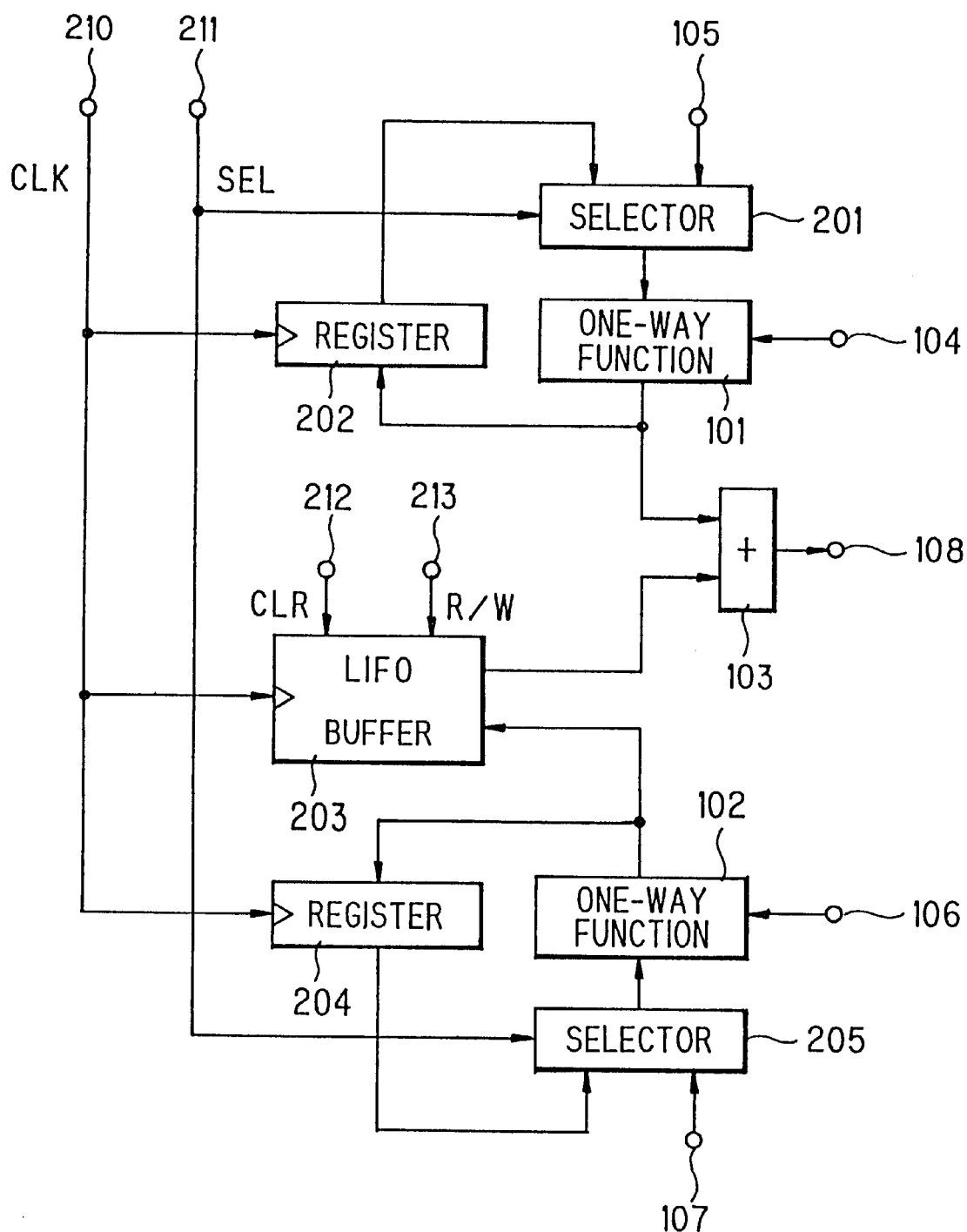
FIG. 2 is a functional block diagram illustrating the apparatus for generating the internal crypto-keys according to a second embodiment of the invention.

FIG. 2 is a functional block diagram illustrating the apparatus for generating the internal crypto-keys according to a second embodiment of the invention, having a first sub-generator comprising a first selector 201, a first one-way-function circuit 101 and a first register 202, a second sub-generator comprising a second selector 205, a second one-way-function circuit 102 and a second register 204, a LIFO (Last-In-First-Out) buffer 203, and an XOR circuit 103.

Figure 5:
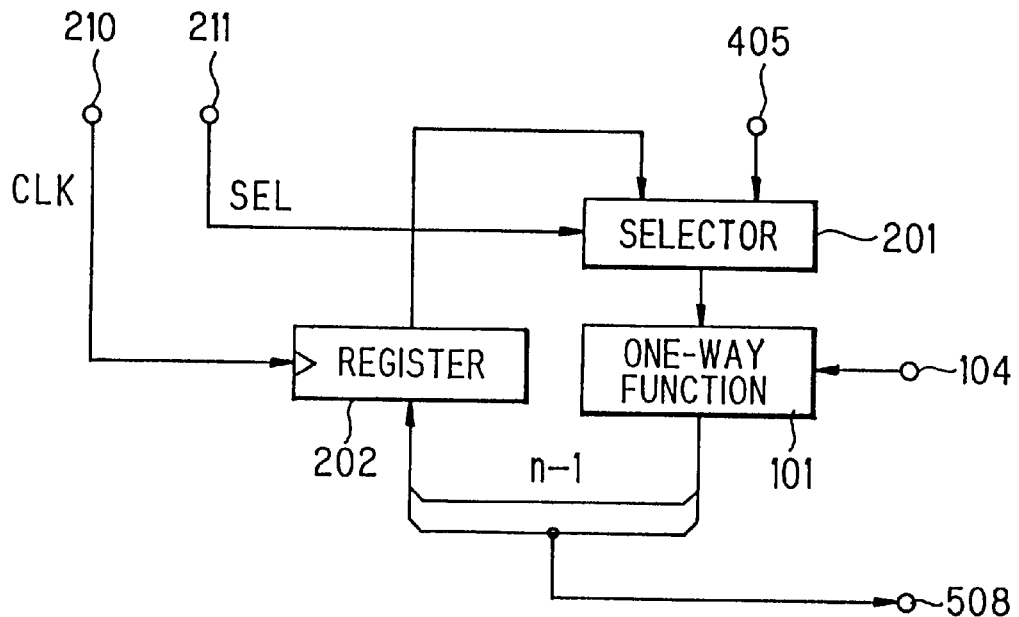
FIG. 5 is a block diagram illustrating a configuration example of a conventional pseudo-random-sequence generator.
Figure 6:
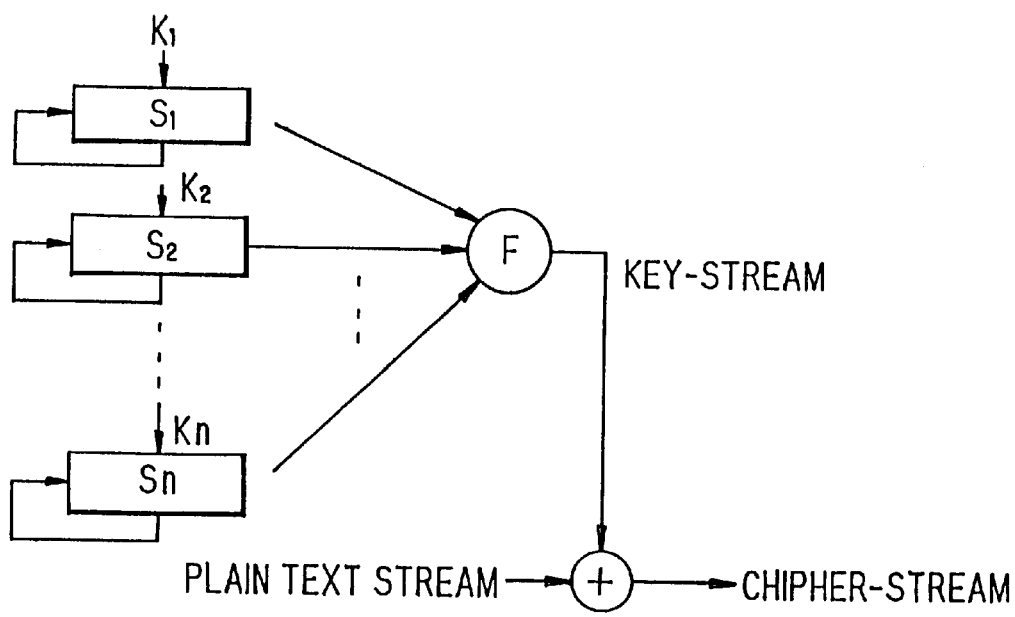
FIG. 6 is a functional block diagram illustrating a configuration example of a pseudo-random-sequence generator having a plurality of feedback-shift-registers.

Each of the first and the second sub-generator has a similar configuration to the pseudo-random-sequence generator of FIG. 5.

Half n bits of an external key of 2n bits are input to the first selector 201 through a first external-key input terminal 105 and the other n bits of the external key are input to the second selector 205 through the second external-key input terminal 107. The first one-way-function circuit 101 outputs a conversion result of n bits by processing an n-bit output of the first selector 201 with a first one-way function according to a first conversion parameter (public key) supplied through a first public-key input terminal 104.

The first register 202 holds the conversion output of the first one-way-function circuit 101 and outputs previously held data of n bits to the first selector 201, in synchronization with a clock pulse CLK supplied through a clock terminal 210.

The first selector 201 selects the n-bit output of the first register 202 when a selection signal SEL supplied through a selection signal input terminal 211 is at logic '1' and selects the first half n bits of the external key supplied through the first external-key input terminal 105 when the selection signal SEL is at logic '0', as the n-bit output to be processed by the first one-way-function circuit 101.

In the same way, the second one-way-function circuit 102 outputs a conversion result of n bits by processing an n-bit output of the second selector 205 with a second one-way function according to a second conversion parameter (public key) supplied through a second public-key input terminal 106. The second register 204 holds the conversion output of the second one-way-function circuit 102 and outputs previously held data of n bits to the second selector 205, in synchronization with the clock pulse CLK. The second selector 205 selects the n-bit output of the second register 204 when the selection signal SEL is at logic '1' and selects the other n bits of the external key supplied through the second external-key input terminal 107 when the selection signal SEL is at logic '0', as the n-bit output to be processed by the second one-way-function circuit 102.

The LIFO buffer 203, comprising a memory and an address counter, initializes the address counter when the clock pulse CLK is supplied during a control signal CLR supplied through a control terminal 212 is at logic '0'.

When the control signal CLR is at logic '1' and a read/write signal R/W supplied through a read/write terminal 213 is at logic '0', the LIFO buffer stores the n-bit output of the second one-way-function circuit 102 in synchronization with the clock pulse CLK at an address indicated by the address counter, incrementing the address counter, and the LIFO buffer outputs n-bit data of an address indicated by the address counter to the XOR circuit 108 in synchronization with the clock pulse CLK decrementing the address counter, when both the read/write signal R/W and the control signal CLR are at logic '1'.

The XOR circuit 103 calculates an XOR bit sequence of n bits to be output as an internal key through an output terminal 108, from outputs of the first one-way-function circuit 101 and the LIFO buffer 203, so that each bit of the XOR bit sequence has XOR logic of corresponding two bits of the n-bit outputs of the first one-way-function circuit 101 and the LIFO buffer 203.

Figure 3:
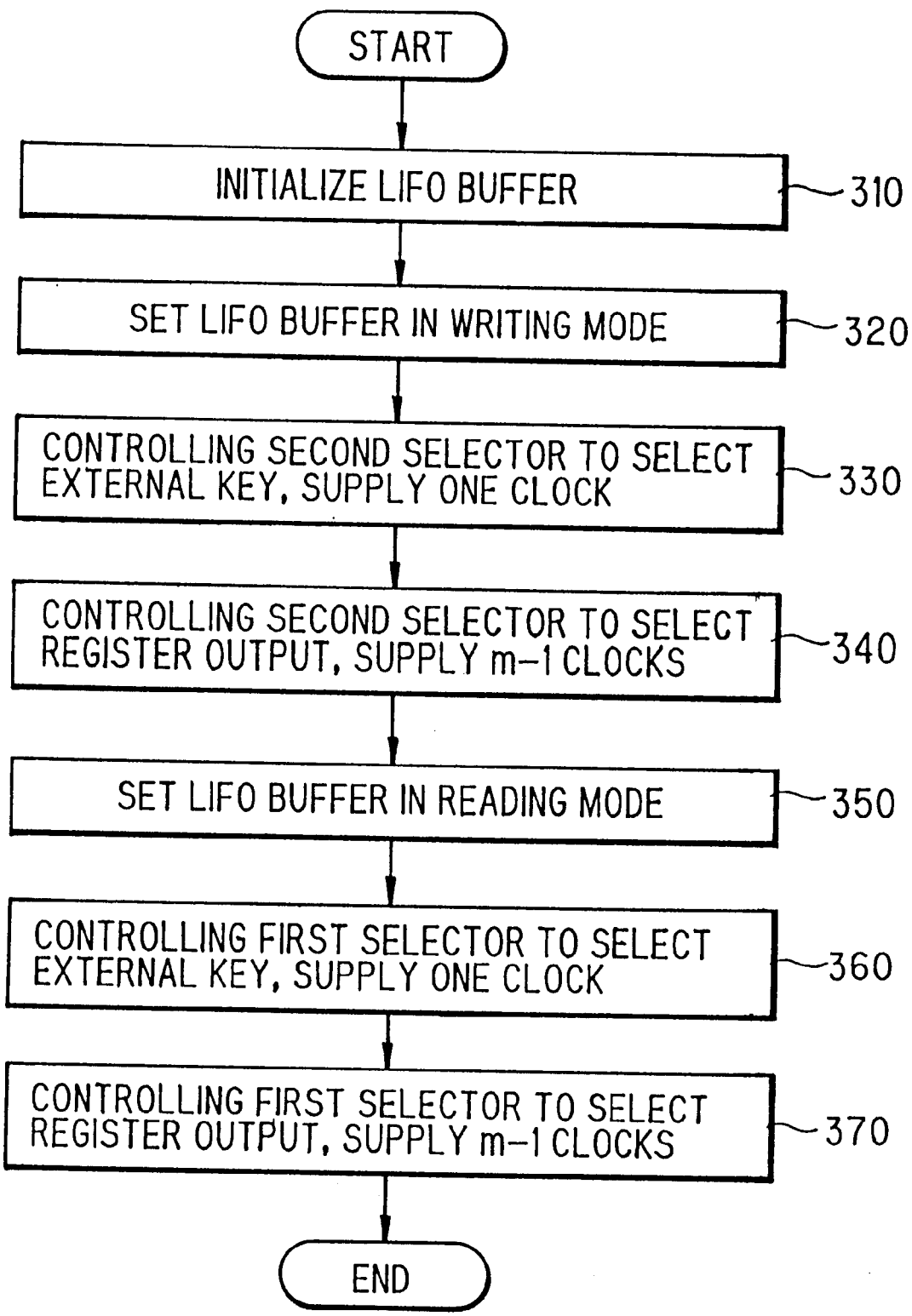
FIG. 3 is a flowchart illustrating operational flow of the second embodiment of FIG. 2.

Now, referring to a flowchart of FIG. 3, operation of the second embodiment of FIG. 2 is described.

Supplying each half of an external key of 2n bits to respective one of the first and the second external-key input terminal 105 and 107, and the first and the second conversion parameters to the first and the second public-key input terminal 104 and 106, respectively, the control signal CLR of logic '0' is supplied to the LIFO buffer 203 for initializing the LIFO buffer 203 with the first clock pulse CLK (at step 310). Then the LIFO buffer 203 is controlled in a writing mode by turning the control signal CLR to logic '1' and supplying the read/write signal R/W of logic '0' (at step 320).

Then the second selector 205 is controlled to select the half bits of the external key supplied through the second external-key input terminal 205 by supplying the selection signal SEL of logic '0', and one clock pulse CLK is supplied (at step 330) to the second register 204 and the LIFO buffer 203. Then, turning the selection signal to logic '1' for controlling the second selector 205 to select n-bit outputs of the second register 204, and m−1 clock pulses CLK are supplied to the second register 204 and the LIFO buffer 203 (at step 340).

Thus, m sets of conversion results of n bits of the second one-way-function circuit 102 are stored in the LIFO buffer 203.

Then, the read/write signal R/W is turned to logic '1' for controlling the LIFO buffer 203 into a reading mode (at step 350), and the selection signal SEL of logic '0' is supplied for controlling the first selector 201 to select the other half of the external key supplied to the first external-key input terminal 105 at the next clock pulse CLK (at step 360).

Then, turning the selection signal SEL to logic '1' for controlling the first selector 201 to select n-bit outputs of the first register 202, m−1 clock pulses CLK are supplied to the first register 202 and the LIFO buffer 203 (at step 370).

Thus controlling the apparatus of FIG. 2, m sets of internal keys of n bits are output from the output terminal 108 in synchronization with the clock pulse CLK set by set at step 360 and step 370, and the internal keys having the same security with the internal keys generated by the first embodiment of FIG. 1 can be obtained with a far simpler configuration than the first embodiment and with only two times calculation time.

Figure 4:
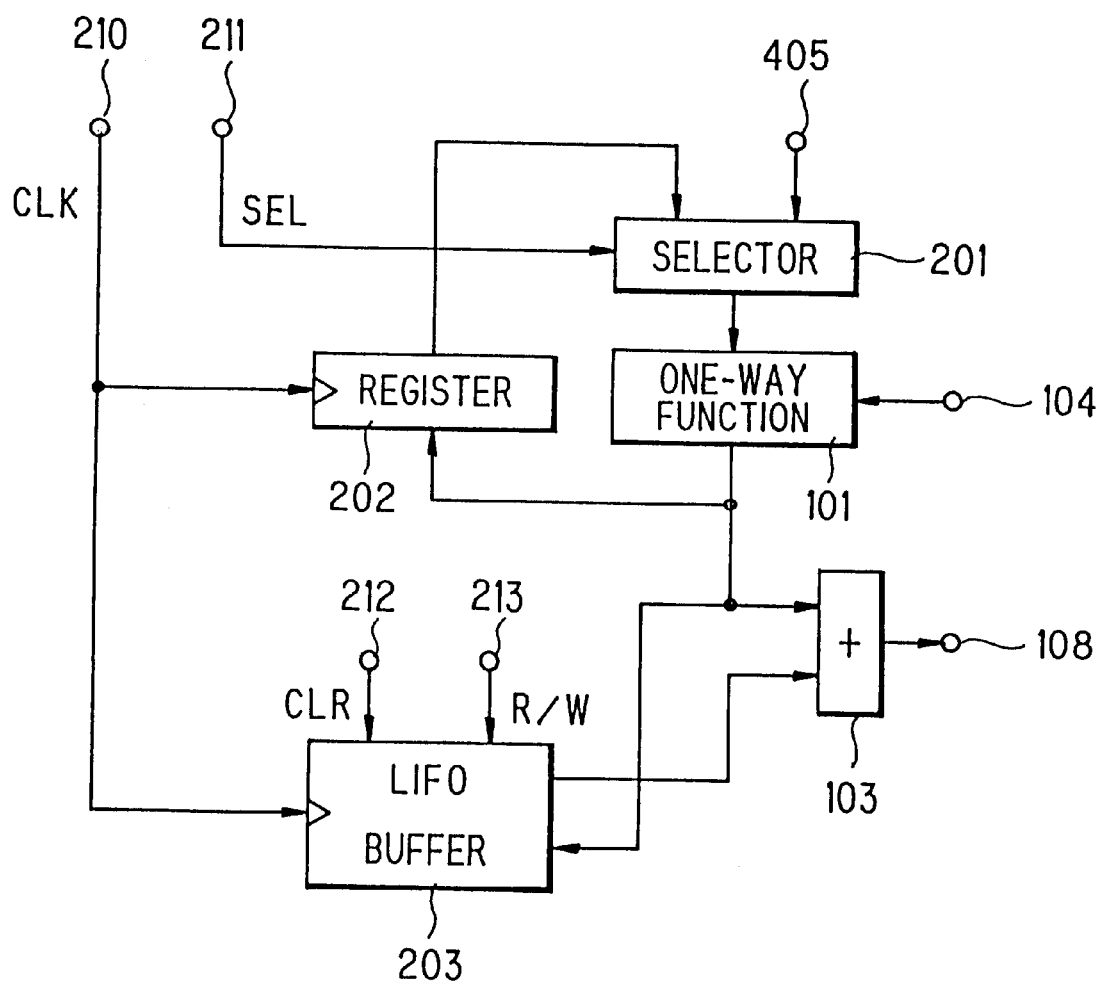
FIG. 4 is a functional block diagram illustrating a third embodiment of the invention.

FIG. 4 is a functional block diagram illustrating a third embodiment of the invention. In the third embodiment, a single n-bit external key is supplied to an external-key input terminal 405 together with a conversion parameter supplied to a public-key input terminal 104. The LIFO buffer 203 is controlled in the writing mode for the first m clock pulses CLK after initialization and the conversion results of a single one-way-function circuit 101 is buffered in the LIFO buffer 203, in a similar way with the second embodiment of FIG. 2. For the following m clock pulses CLK, the LIFO buffer 203 is set in the reading mode, and the output of the LIFO buffer 203 is XORed with the conversion result of the one-way-function circuit 101 by the XOR circuit 103 clock by clock to be output as each of the m sets of the internal keys.

As above described, the apparatus of FIG. 4 is equivalent to the apparatus of FIG. 2 on condition that the same n-bit external keys are supplied to the the first and the second external-key input terminal 105 and 107, and the first and the second one-way-function circuit 101 and 102 output conversion results by processing the output of respective selectors 201 and 205 with the same one-way function according to the same conversion parameters, in the second embodiment of FIG. 2. Therefore, duplicated explanation is omitted.

However, either or both the external key and the conversion parameter to be supplied to the third embodiment may be changed for the first m clocks and for the following m clocks, of cause.

According to the third embodiment of FIG. 4, the second one-way-function circuit 102, the second register 204 and the second selector 205 can be further economized compared to the second embodiment of FIG. 2.

Heretofore, internal keys of n-bit length are described to be generated from an external key of 2n-bits or n bits. However, when bit-length of the given external key is shorter, necessary number of bits having any logic may be supplemented, or, a part of outputs of the output terminal 108 or the $108_1$ to $108_m$ may be used as the internal keys, when bit-length of the required internal keys is shorter. Further, the XOR circuit 103, or $103_1$ to $103_m$ may be replaced with any appropriate combining functions.

Still further, the one-way-function circuits 101, 102, $101_1$ to $101_m$, or $102_1$ to $102_m$ may be replaced with non-linear function circuits when required security is not so high, on condition that inverse prediction is sufficiently difficult in the non-linear function circuits.

What is claimed is:

1. A method of generating internal crypto-keys to be set as initial values in feedback registers of an pseudo-random-sequence generator of a stream cipher system from an external key; the method comprising:

a step of outputting m sets of first conversion results, each i-th of the m sets of first conversion results being obtained by processing an (i−1)-th of the m sets of first conversion results with a first nonlinear function and a first of the m sets of first conversion results being obtained by processing a first part of the external key with the first nonlinear function, m being a positive integer more than one, i being a positive integer more than one and not more than m, and the first nonlinear function being a function wherein a variable giving a value of the function is difficult to be estimated from the value of the function;

a step of outputting m sets of second conversion results, each i-th of the m sets of second conversion results being obtained by processing an (i−1)-th of the m sets of first conversion results with a second nonlinear function and a first of the m sets of second conversion results being obtained by processing a second part of the external key with the second nonlinear function, the second nonlinear function being a function wherein a variable giving a value of the function is difficult to be estimated from the value of the function; and a step of outputting each j-th of m internal crypto-keys by combining an j-th of the m sets of first conversion results and an (m−j+1)-th of the m sets of second conversion results according to a combining function, j being a positive integer not more than m.

2. A method of generating internal crypto-keys as recited in claim 1; wherein at least one of the first nonlinear function and the second nonlinear function is a one-way function wherein a variable giving a value of the one-way function is substantially impossible to be estimated from the value of the one-way function.

3. A method of generating internal crypto-keys as recited in claim 1; wherein each bit of the j-th of the m internal crypto-keys has XOR (eXclusive OR) logic of corresponding bits of the j-th of the m sets of first conversion results and the (m−j+1)-th of the m sets of second conversion results.

4. An apparatus for generating internal crypto-keys to be set as initial values in feedback registers of an pseudo-random-sequence generator of a stream cipher system from an external key; the apparatus comprising:

a first cascade connection of m one-way-function circuits, a first one-way-function circuit of the first cascade connection outputting a conversion result by processing a first part of the external key with a first one-way-function and each i-th one-way-function circuit of the first cascade connection outputting a conversion result by processing an output of an (i−1)-th one-way-function circuit of the first cascade connection with the first one-way-function, m being a positive integer more than one, i being a positive integer more than one and not more than m, and the first one-way-function being a function wherein a variable giving a value of the function is substantially impossible to be estimated from the value of the function;

a second cascade connection of m one-way-function circuits, a first one-way-function circuit of the second cascade connection outputting a conversion result by processing a second part of the external key with a second one-way-function and each i-th one-way-function circuit of the second cascade connection outputting a conversion result by processing an output of an (i−1)-th one-way-function circuit of the second cascade connection with the second one-way-function, the second one-way-function being a function wherein a variable giving a value of the function is substantially impossible to be estimated from the value of the function; and m combining functions, each j-th of the m combining function outputting j-th of m internal crypto-keys by combining outputs of a j-th one-way-function circuit of the first cascade connection and an (m−j+1)-th one-way-function circuit of the second cascade connection, j being a positive integer not more than m.

5. An apparatus for generating internal crypto-keys to be set as initial values in feedback registers of an pseudo-random-sequence generator of a stream cipher system from an external key; the apparatus comprising:

a first one-way-function circuit for outputting a conversion result by processing an input bit sequence with a first one-way function, the first one-way-function being a function wherein a variable giving a value of the function is substantially impossible to be estimated from the value of the function;

a first register for holding the conversion result outputted from the first one-way-function circuit and outputting the conversion result previously held in the first register in synchronization with a clock signal;

a first selector for selecting either a first part of the external key or an output of the first register according to a selection signal as the input bit sequence to be processed by the first one-way-function circuit;

a second one-way-function circuit for outputting a conversion result by processing an input bit sequence with a second one-way function, the second one-way-function being a function wherein a variable giving a value of the function is substantially impossible to be estimated from the value of the function;

a second register for holding the conversion result outputted from the second one-way-function circuit and outputting the conversion result previously held in the second register in synchronization with the clock signal;

a second selector for selecting either a second part of the external key or an output of the second register according to the selection signal as the input bit sequence to be processed by the second one-way-function circuit;

a LIFO (Last-In-First-Out) buffer wherein conversion results outputted from the second one-way-function circuit are stacked in synchronization with the clock signal when the LIFO buffer is controlled in a writing mode, and the conversion results stacked in the LIFO buffer are popped up in synchronization with the clock signal when the LIFO buffer is controlled in a reading mode; and a combining circuit for outputting internal crypto-keys in synchronization with the clock signal by combining outputs of the LIFO buffer and the first one-way-function circuit.

6. An apparatus for generating internal crypto-keys to be set as initial values in feedback registers of an pseudo-random-sequence generator of a stream cipher system from an external key; the apparatus comprising:

a one-way-function circuit for outputting a conversion result by processing an input bit sequence with a one-way function, the one-way-function being a function wherein a variable giving a value of the function is substantially impossible to be estimated from the value of the function;

a register for holding the conversion result outputted from the one-way-function circuit and outputting the conversion result previously held in the register in synchronization with a clock signal;

a selector for selecting either the external key or an output of the register according to a selection signal as the input bit sequence to be processed by the one-way-function circuit;

a LIFO buffer wherein conversion results output from the one-way-function circuit are stacked in synchronization with the clock signal when the LIFO buffer is controlled in a writing mode, and the conversion results stacked in the LIFO buffer are popped up in synchronization with the clock signal when the LIFO buffer is controlled in a reading mode; and a combining circuit for outputting internal crypto-keys in synchronization with the clock signal by combining outputs of the LIFO buffer and the one-way-function circuit.

7. An apparatus for generating internal crypto-keys as recited in claim 5; wherein each bit of an internal crypto-key output by the combining circuit has XOR logic of corresponding bits of outputs of the first one-way-function circuit and the LIFO buffer.

8. An apparatus for generating internal crypto-keys as recited in claim 6; wherein each bit of an internal crypto-key output by the combining circuit has XOR logic of corresponding bits of outputs of the one-way-function circuit and the LIFO buffer.

* * * * *